(12) United States Patent
Zhang (10) Patent No.: US 11,142,074 B2
(45) Date of Patent: Oct. 12, 2021

(54) EXPLOSION-PROOF VALVE, BATTERY PACK, AND ELECTRIC VEHICLE

(71) Applicant: CONTEMPORARY AMPEREX TECHNOLOGY CO., LIMITED, Ningde (CN)

(72) Inventor: Haidong Zhang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/123,005

(22) Filed: Dec. 15, 2020

(65) Prior Publication Data

US 2021/0101485 A1 Apr. 8, 2021

Related U.S. Application Data

(63) Continuation of application No. PCT/CN2020/102835, filed on Jul. 17, 2020.

(30) Foreign Application Priority Data

Aug. 23, 2019 (CN) .......................... 201910785077.7

(51) Int. Cl.
*B60L 50/64* (2019.01)
*B60L 3/00* (2019.01)
(Continued)

(52) U.S. Cl.
CPC ............. *B60L 3/0046* (2013.01); *B60L 50/64* (2019.02); *H01M 50/244* (2021.01);
(Continued)

(58) Field of Classification Search
CPC .... B60L 3/0046; B60L 50/64; H01M 50/249; H01M 50/244; H01M 50/3425; H01M 2200/20
(Continued)

(56) References Cited

U.S. PATENT DOCUMENTS

2014/0356678 A1* 12/2014 Templeman .......... H01M 50/20
429/100

FOREIGN PATENT DOCUMENTS

CN 102054951 A 5/2011
CN 107035900 A * 8/2017
(Continued)

OTHER PUBLICATIONS

Contemporary Amperex Technology Co., Limited, International Search Report and Written Opinion, PCT/CN2020/102835, dated Oct. 12, 2019, 14 pgs.

*Primary Examiner* — John D Walters
*Assistant Examiner* — Hilary L Johns
(74) *Attorney, Agent, or Firm* — Morgan, Lewis & Bockius LLP (57) ABSTRACT

The present application provides an explosion-proof valve, a battery pack, and an electric vehicle. The explosion-proof valve includes a first connection member, a second connection member, a resilient connection member, and an explosion-proof film. An upper port is formed on the first connection member that includes an ejector pin. The second connection member is disposed at an interval from the first connection member. The first and second connection members are tightly in a sealed connection with the resilient connection member. The explosion-proof film is disposed at the upper port and seals the upper port, and the explosion-proof film is located above the ejector pin. Because the explosion-proof valve is directly disposed on a base plate of a case in a vehicle body using the first and second connection members, the explosion-proof valve can fully use narrow space between the base plate of the battery pack and the vehicle body.

20 Claims, 8 Drawing Sheets

(51) Int. Cl.
    *H01M 50/249* (2021.01)
    *H01M 50/244* (2021.01)
    *H01M 50/342* (2021.01)
(52) U.S. Cl.
    CPC ..... *H01M 50/249* (2021.01); *H01M 50/3425* (2021.01); *H01M 2200/20* (2013.01); *H01M 2220/20* (2013.01)
(58) Field of Classification Search
    USPC .......................................................... 180/271
    See application file for complete search history.

(56)           References Cited

FOREIGN PATENT DOCUMENTS

| | | |
|---|---|---|
| CN | 107035900 A | 8/2017 |
| CN | 207441825 U | 6/2018 |
| DE | 102015005276 A1 | 10/2016 |
| WO | WO-2018209282 A1 * 11/2018 ............ H01M 50/30 |

* cited by examiner

EXPLOSION-PROOF VALVE, BATTERY PACK, AND ELECTRIC VEHICLE

CROSS REFERENCE TO RELATED APPLICATIONS

This application is a continuation application of PCT Patent Application No. PCT/CN2020/102835, entitled "EXPLOSION-PROOF VALVE, BATTERY PACK, AND ELECTRIC VEHICLE" filed on Jul. 17, 2020, which claims priority to Chinese Patent Application No. 201910785077.7, filed with the State Intellectual Property Office of the People's Republic of China on Aug. 23, 2019, and entitled "EXPLOSION-PROOF VALVE, BATTERY PACK, AND ELECTRIC VEHICLE", all of which are incorporated herein by reference in their entirety.

TECHNICAL FIELD

The present application relates to the field of battery technologies, and in particular, to an explosion-proof valve, a battery pack, and an electric vehicle.

BACKGROUND

When a battery pack is applied to an electric vehicle, the battery pack is usually fixed in a vehicle body of the electric vehicle. Because batteries in a battery pack may abruptly generate massive gas due to overcharge, short circuit, or puncturing. In this case, the gas needs to be discharged out of the vehicle body of the electric vehicle in a timely manner, to avoid an explosion caused by excessively high air pressure in the battery pack.

Currently, to discharge the gas in the battery pack out of the vehicle body of the electric vehicle, a common practice is: mounting an explosion-proof valve on a lateral side of the battery pack, and connecting the explosion-proof valve to outside of the vehicle body by using an exhaust pipe (in this case, one end of the exhaust pipe is connected to the explosion-proof valve, and the other end of the exhaust pipe protrudes out of the vehicle body via an exhaust vent in the vehicle body). However, in this manner of disposing the explosion-proof valve and exhaust pipe on the lateral side, a total size of the battery pack is increased; therefore, energy density of the battery pack is reduced. When the battery pack is mounted in the vehicle body of the electric vehicle, available space of the battery pack in the vehicle body is reduced, and therefore space utilization of the battery pack in the vehicle body is reduced.

SUMMARY

In view of the existing problem in the prior art, an objective of the present application is to provide an explosion-proof valve, a battery pack, and an electric vehicle. Because the explosion-proof valve is disposed between a bottom of a case of the battery pack and a vehicle body, space utilization of the battery pack in the vehicle body is improved. Because the explosion-proof valve is directly connected to outside of the vehicle body, no additional exhaust pipe structure needs to be provided for the battery pack. Therefore, not only a structure of the battery pack is simplified, but also a total size of the battery pack is reduced, and further, energy density of the battery pack is increased.

To achieve the foregoing objective, the present application provides an explosion-proof valve that includes a first connection member, a second connection member, a resilient connection member, and an explosion-proof film. An upper port is formed on the first connection member, and the first connection member includes an ejector pin. The second connection member is located below the first connection member in an up-down direction, and is disposed at an interval from the first connection member. The resilient connection member sleeves the first connection member and the second connection member, and is in a sealed connection with the first connection member and the second connection member. The explosion-proof film is disposed at the upper port of the first connection member and seals the upper port, and the explosion-proof film is located above the ejector pin in the up-down direction.

The first connection member includes a first principal portion and a first connection portion. The first principal portion extends along the up-down direction and the upper port is formed therein, the first connection portion extends along the up-down direction and is located below the first principal portion, and the first connection portion is in a sealed connection with the resilient connection member.

The first connection member further includes a first stop portion and a first extension portion. The first stop portion is formed at a circumferential exterior of the first principal portion and protrudes from the first principal portion, the first extension portion is formed at a circumferential exterior of the first principal portion and protrudes from the first principal portion, and the first extension portion is disposed at an interval from the first stop portion in the up-down direction. The explosion-proof valve further includes a first sealing member, and the first principal portion is sleeved with the first sealing member between the first stop portion and the first extension portion.

The first connection member further includes a support portion, the support portion is formed at a circumferential interior of the first principal portion and protrudes from the first principal portion, and the ejector pin is disposed in the support portion and faces the explosion-proof film.

The second connection member includes a second principal portion and a second connection portion. The second principal portion extends along the up-down direction, the second connection portion extends along the up-down direction and is located above the second principal portion, and the second connection portion is in a sealed connection with the resilient connection member.

The second connection member further includes a second stop portion and a second extension portion. The second stop portion is formed at a circumferential exterior of the second principal portion and protrudes from the second principal portion, the second extension portion is formed at a circumferential exterior of the second principal portion and protrudes from the second principal portion, and the second extension portion is disposed at an interval from the second stop portion in the up-down direction. The explosion-proof valve further includes a second sealing member, and the second principal portion is sleeved with the second sealing member between the second stop portion and the second extension portion.

The first connection member further includes a first pole portion, and the first pole portion extends along the up-down direction and is located below the first connection portion. The second connection member further includes a plurality of second pole portions and resilient cantilevers, the plurality of second pole portions are disposed at intervals along a circumferential direction, each second pole portion extends along the up-down direction and is connected to the second principal portion, and a resilient cantilever is connected to two adjacent second pole portions in a cantilever mode. The resilient cantilever of the second connection member cooperates with the first pole portion of the first connection member, so that the first connection member is connected to the second connection member.

A cooperation mode between the resilient cantilever of the second connection member and the first pole portion of the first connection member is tongue-groove cooperation.

The resilient cantilever has a first end portion, a second end portion, and a coupling shaft portion. The first end portion and the second end portion are located on two sides of the coupling shaft portion in the up-down direction, and the coupling shaft portion protrudes from the first end portion and the second end portion and is connected to two adjacent second pole portions. The first end portion of the resilient cantilever cooperates with an end of the first pole portion, so that the first connection member is connected to the second connection member.

The resilient cantilever is inclined relative to a central axis of a hollow cavity enclosed by the plurality of second pole portions.

The present application further provides a battery pack, including a case and the foregoing explosion-proof valve. The case includes a base plate, and the base plate is provided with a first mounting hole. The first connection member of the explosion-proof valve is disposed in the first mounting hole and in a sealed connection with the base plate, and the second connection member and the resilient connection member are located below the base plate in the up-down direction.

The explosion-proof valve of the battery pack is directly disposed on the base plate of the case by using the first connection member and directly disposed in the vehicle body by using the second connection member, a part of the explosion-proof valve inserts into the case, and a part of the explosion-proof valve protrudes out of the vehicle body.

The present application further provides an electric vehicle, including a vehicle body and the foregoing battery pack, where the vehicle body is provided with a second mounting hole, and the second connection member of the explosion-proof valve is disposed in the second mounting hole and in a sealed connection with the vehicle body.

The first connection member includes a first pole portion, and the first pole portion extends along the up-down direction. The second connection member includes a plurality of second pole portions and resilient cantilevers, the plurality of second pole portions are disposed at intervals along a circumferential direction, each second pole portion extends along the up-down direction, and a resilient cantilever is connected to second pole portions in a cantilever mode. An end of the first pole portion and a part of the second pole portion both extend below the second mounting hole.

The resilient cantilever has a first end portion, a second end portion, and a coupling shaft portion. The first end portion and the second end portion are located on two sides of the coupling shaft portion in the up-down direction, and the coupling shaft portion protrudes from the first end portion and the second end portion and is connected to two adjacent second pole portions. The second end portion is located in the second mounting hole, the first end portion extends below the second mounting hole, and a surrounding wall of the second mounting hole firmly presses the second end portion of the resilient cantilever, so that the first end portion of the resilient cantilever and the end of the first pole portion are opposite to each other and disposed at an interval.

Because the explosion-proof valve of the battery pack is directly disposed on a base plate of a case by using the first connection member, and directly disposed in a vehicle body of a vehicle having the battery pack by using the second connection member, the explosion-proof valve can fully use narrow space between the base plate of the battery pack and the vehicle body. Therefore, space utilization of the battery pack in the vehicle body is improved. Moreover, based on a connection relationship between the first connection member, the resilient connection member, and the second connection member, the explosion-proof valve is connected to outside of the vehicle body. Therefore, no additional exhaust pipe structure that protrudes out of the vehicle body needs to be provided for the battery pack. Therefore, not only a structure of the battery pack is simplified, but also a total size of the battery pack is reduced, and further, energy density of the battery pack is increased. In addition, when the electric vehicle runs on a bumpy road, the explosion-proof valve can further absorb an external vibration and impact in a timely manner based on resilience of the resilient connection member, thereby improving reliability of the connection between the battery pack and the vehicle body and reliability of sealing.

Reference numerals:

1: battery pack
11: base plate
111: first mounting hole
12: explosion-proof valve
121: first connection member
1211: upper port
1212: ejector pin
121A: first principal portion
121B: first stop portion
121C: first connection portion
121D: support portion
121E: first extension portion
121F: first pole portion
122: second connection member -continued Reference numerals:

122A: second principal portion
122B: second stop portion
122C: second connection portion
122D: second extension portion
122E: second pole portion
122F: resilient cantilever
F1: first end portion
F2: second end portion
F3: coupling shaft portion
123: resilient connection member
124: explosion-proof film
125: first sealing member
126: second sealing member
2: vehicle body
21: second mounting hole
H: tongue
C: groove
S: fastener
Z: up-down direction

DESCRIPTION OF EMBODIMENTS

To make the objectives, technical solutions, and advantages of this application more comprehensible, the following describes this application in detail with reference to embodiments and accompanying drawings. It should be understood that the specific embodiments described herein are merely used to explain this application but are not intended to limit this application.

In the descriptions of this application, unless otherwise specified and defined explicitly, the terms "first" and "second" are merely intended for a purpose of description, and should not be understood as any indication or implication of relative importance; the term "plurality of" indicates two or more (including two); and unless otherwise specified and defined explicitly, the terms "connection" and "fixing" should be understood in their general senses. For example, the "connection" may be a fixed connection, a detachable connection, an integrated connection, or an electrical connection; and may be a direct connection, or an indirect connection through an intermediate medium. A person of ordinary skill in the art can understand specific meanings of these terms in this application based on specific situations.

In the descriptions of the specification, it should be understood that the directional terms such as "up" and "down" described in the embodiments of this application are described from angles shown in the accompanying drawings, and should not be understood as a limitation on the embodiments of this application. This application is hereinafter further described in detail with reference to specific embodiments and accompanying drawings.

Referring to FIG. 1 to FIG. 7, an electric vehicle may include a battery pack 1 and a vehicle body 2. The battery pack 1 is fixed in the vehicle body 2 by using a fastener S. The vehicle body 2 may be made of sheet metal, and the vehicle body 2 is provided with a second mounting hole 21.

The battery pack 1 may include a case, a plurality of batteries (not shown) accommodated in the case, and an explosion-proof valve 12 mounted in the case. The case is accommodated in the vehicle body 2, and includes a base plate 11 for supporting the plurality of batteries. The base plate 11 faces the vehicle body 2 and is provided with a first mounting hole 111 that is through in an up-down direction Z.

One end of the explosion-proof valve 12 is disposed in the first mounting hole 111 of the base plate 11 and in a sealed connection with the base plate 11. The other end of the explosion-proof valve 12 is disposed in the second mounting hole 21 of the vehicle body 2 and in a sealed connection with the vehicle body 2. In addition, a part of the explosion-proof valve 12 inserts into the case, and a part of the explosion-proof valve 12 protrudes out of the vehicle body 2. Therefore, when massive gas is generated in the case of the battery pack 1, the battery pack 1 can discharge the gas in the case out of the vehicle body 2 in a timely manner by using the explosion-proof valve 12.

Specifically, referring to FIG. 1 to FIG. 13, the explosion-proof valve 12 may include a first connection member 121, a second connection member 122, a resilient connection member 123, an explosion-proof film 124, a first sealing member 125, and a second sealing member 126.

Figure 8:
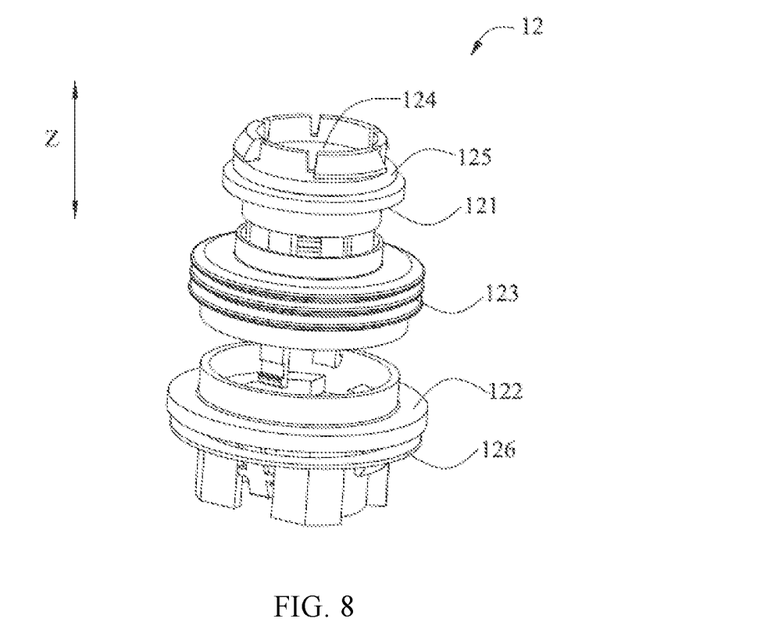
FIG. 8 is a three-dimensional exploded view of an explosion-proof valve of a battery pack in FIG. 1.
Figure 9:
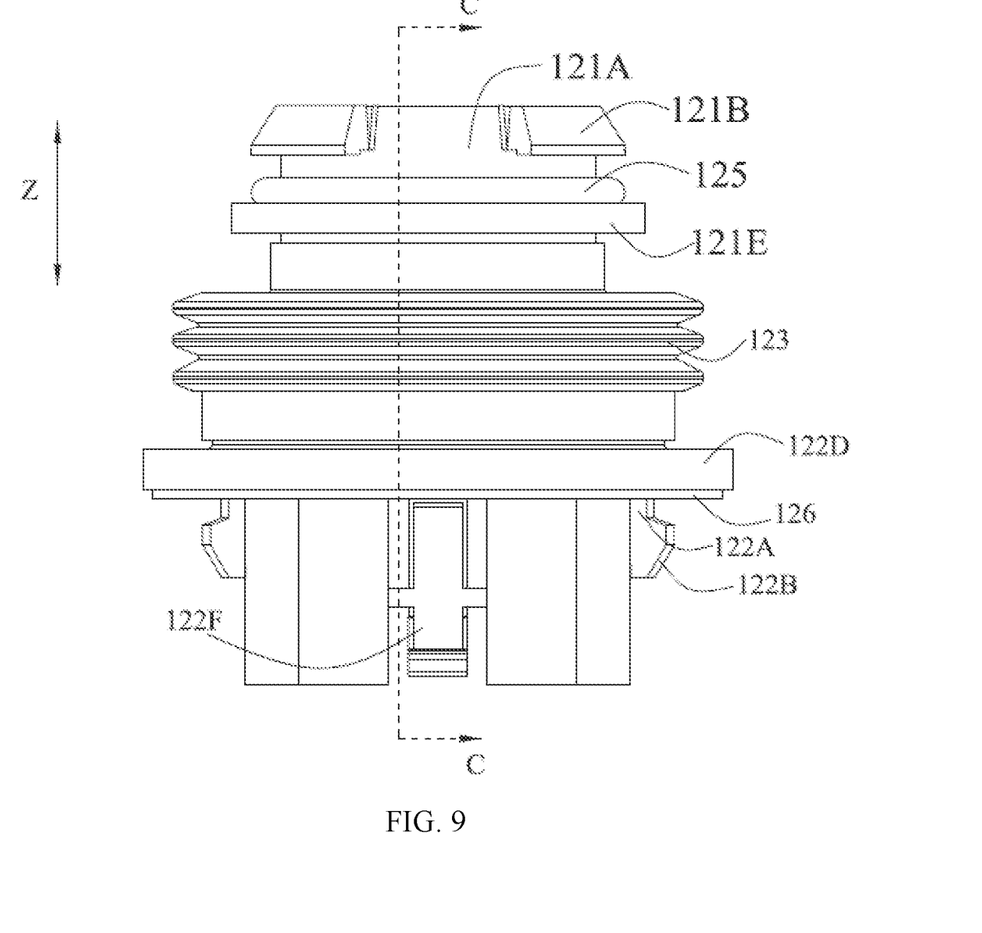
FIG. 9 is a main view of an explosion-proof valve of a battery pack.
Figure 10:
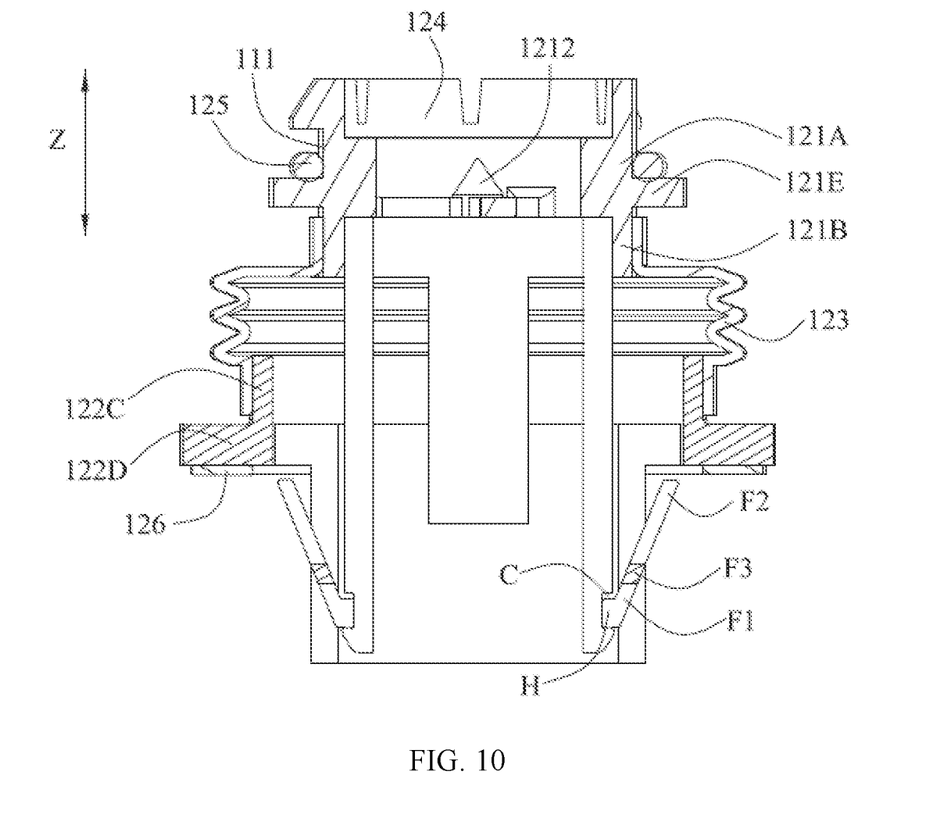
FIG. 10 is a sectional view taken along a C-C line in FIG. 9.
Figure 11:
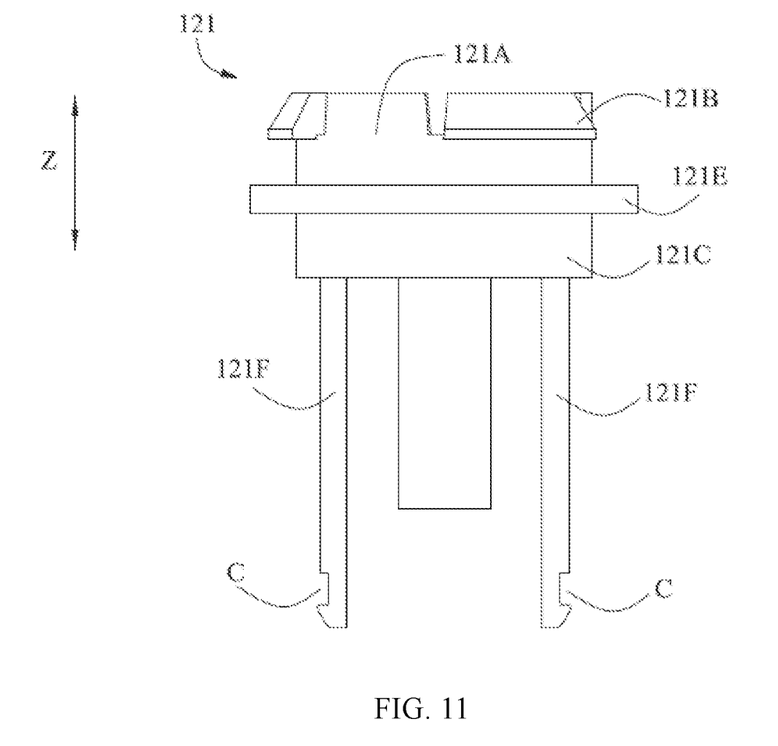
FIG. 11 is a main view of a first connection member of an explosion-proof valve in FIG. 8.

Referring to FIG. 8 to FIG. 10, the first connection member 121 is mounted on the base plate 11 by using the first mounting hole 111, an upper port 1211 is formed on the first connection member 121, and the first connection member 121 includes an ejector pin 1212. The explosion-proof film 124 is disposed at the upper port 1211 of the first connection member 121 and seals the upper port 1211, and the explosion-proof film 124 is located above the ejector pin 1212 in the up-down direction Z. When massive gas is generated in the case of the battery pack 1, the massive gas extrudes down the explosion-proof film 124, until the explosion-proof film 124 is pierced by the ejector pin 1212. In this way, the first connection member 121 is connected to the inside of the case to discharge the gas in the case.

The second connection member 122 is located below the first connection member 121 in the up-down direction Z, and is disposed at an interval from the first connection member 121. In addition, the second connection member 122 is mounted in the vehicle body 2 by using the second mounting hole 21.

The resilient connection member 123 sleeves the first connection member 121 and the second connection member 122, and is in a sealed connection with the first connection member 121 and the second connection member 122. The second connection member 122 is connected to outside of the vehicle body 2, and connected to the first connection member 121 by the resilient connection member 123.

In the electric vehicle in this application, because the explosion-proof valve 12 of the battery pack 1 is directly disposed on the base plate 11 (that is, a bottom of the battery pack 1) of the case by using the first connection member 121, and directly disposed in the vehicle body 2 by using the second connection member 122, the explosion-proof valve 12 can fully use narrow space between the base plate 11 of the battery pack 1 and the vehicle body 2. Therefore, space utilization of the battery pack 1 in the vehicle body 2 is improved. Moreover, based on a connection relationship between the first connection member 121, the resilient connection member 123, and the second connection member 122, the explosion-proof valve 12 is connected to the outside of the vehicle body 2. Therefore, no additional exhaust pipe structure that protrudes out of the vehicle body 2 needs to be provided for the battery pack 1. Therefore, not only a structure of the battery pack 1 is simplified, but also a total size of the battery pack 1 is reduced, and further, energy density of the battery pack 1 is increased (that is, if mounting space in the vehicle body 2 keeps unchanged, the energy density of the battery pack 1 in this application is higher than that of a battery pack of a conventional structure). In addition, when the electric vehicle runs on a bumpy road, based on resilience of the resilient connection member 123, the explosion-proof valve 12 not only can absorb an assembly tolerance between the battery pack 1 and the vehicle body 2, but also can absorb an external vibration and impact in a timely manner, thereby improving reliability of the connection between the battery pack 1 and the vehicle body 2 and reliability of sealing.

Referring to FIG. 3, FIG. 5, FIG. 7, and FIG. 9 to FIG. 11, the first connection member 121 of the explosion-proof valve 12 may include a first principal portion 121A, a first stop portion 121B, a first connection portion 121C, a support portion 121D, and a first extension portion 121E.

The first principal portion 121A extends along the up-down direction Z and the upper port 1211 is formed therein. In addition, a part of the first principal portion 121A is accommodated in the first mounting hole 111, and a part of the first principal portion 121A protrudes out of the first mounting hole 111 (that is, this part is accommodated in the case). The first principal portion 121A may form a cylinder-shaped structure.

Figure 1:
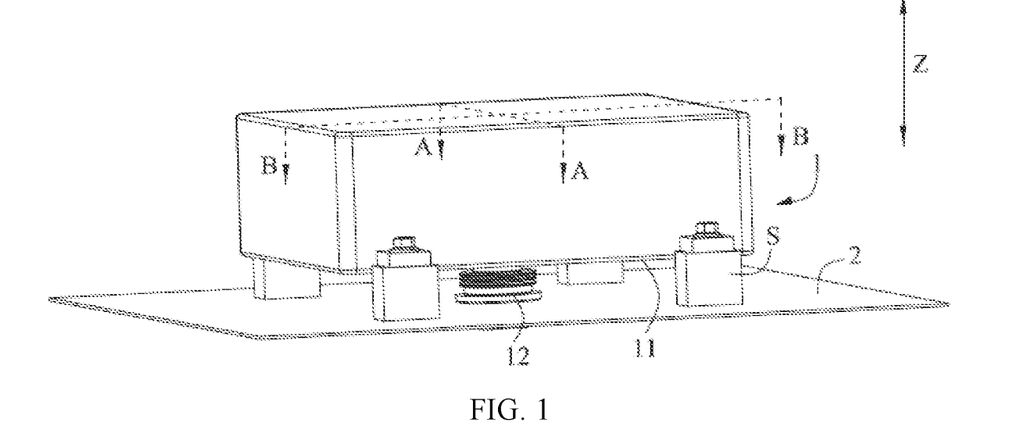
FIG. 1 is a three-dimensional view of an electric vehicle according to the present application, where only a part of a vehicle body is shown for clarity.
Figure 2:
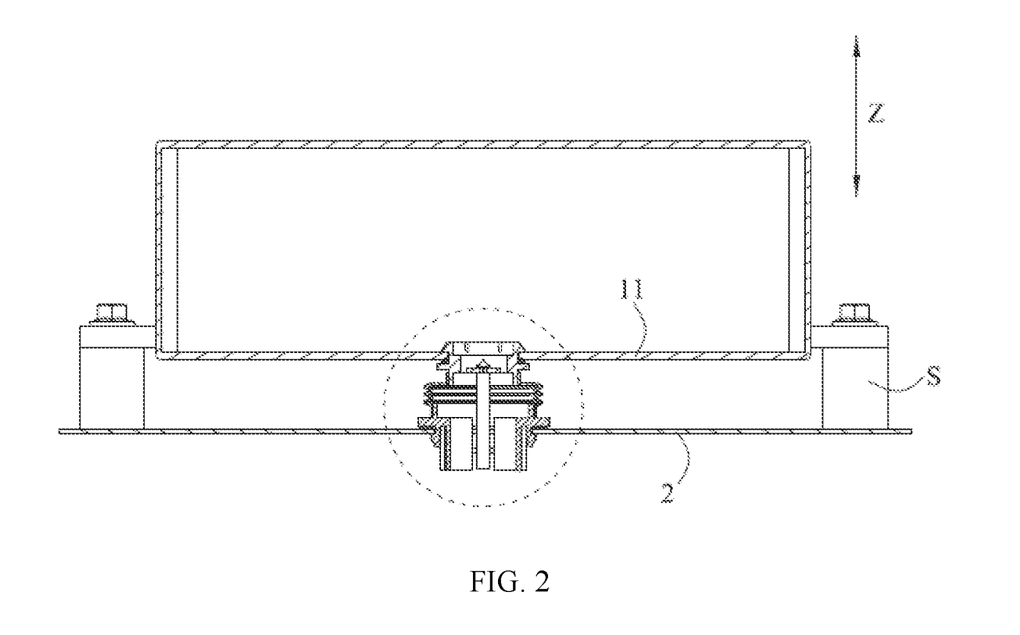
FIG. 2 is a sectional view taken along an A-A line in FIG. 1.
Figure 3:
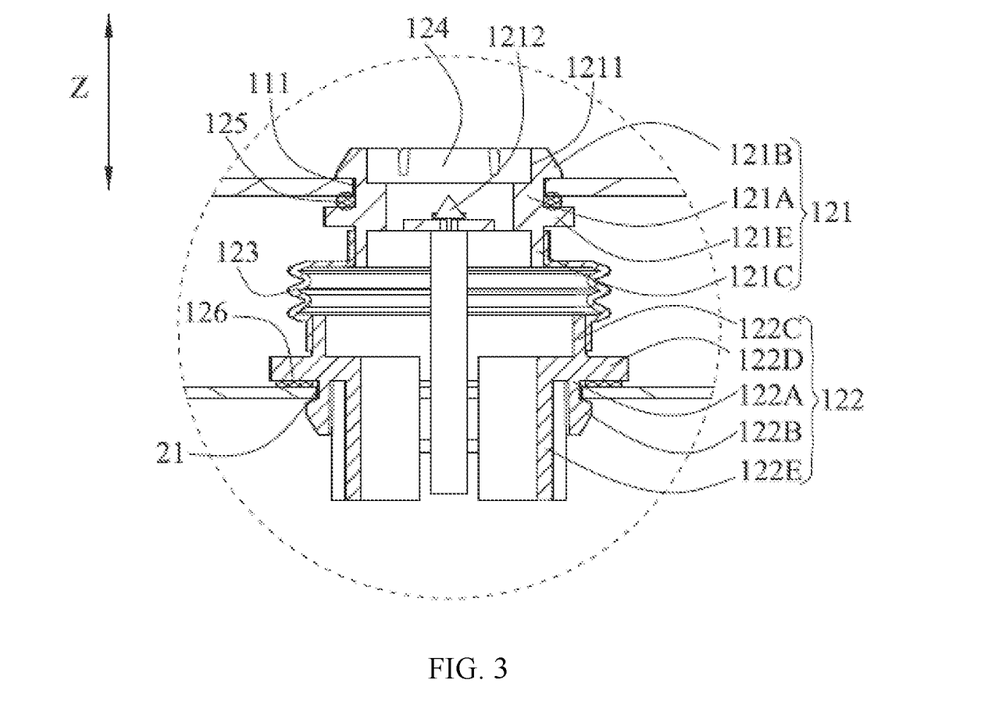
FIG. 3 is an enlarged view of a circled part in FIG. 2.
Figure 4:
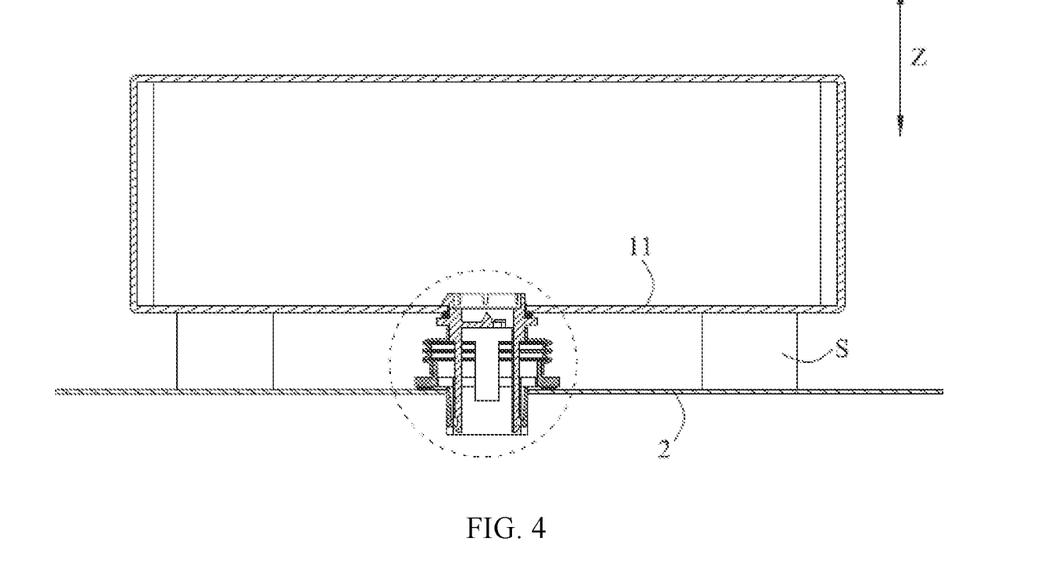
FIG. 4 is a sectional view taken along a B-B line in FIG. 1, where an explosion-proof valve of a battery pack and a vehicle body are in a completely assembled state.

The first stop portion 121B is disposed in the part of the first principal portion 121A that inserts into the case, and the first stop portion 121B may be formed at a circumferential exterior of the first principal portion 121A and protrudes from the first principal portion 121A. After the first connection member 121 of the explosion-proof valve 12 is mounted on the base plate 11 by using the first mounting hole 111 (as shown in FIG. 3), the first stop portion 121B of the first connection member 121 stops above the base plate 11, so that the explosion-proof valve 12 is fixed on the base plate 11.

At least an exterior surface part of the first stop portion 121B that is located above in the up-down direction Z forms a slope, so that the first stop portion 121B can extend into the case with the first principal portion 121A. Further, the first stop portion 121B has certain resilience. To improve resilience of the first stop portion 121B when the first stop portion 121B inserts s into the case, there may be a plurality of first stop portions 121B, and the plurality of first stop portions 121B are disposed at intervals along a circumferential direction of the first principal portion 121A.

The first connection portion 121C extends along the up-down direction Z and is located below the first principal portion 121A. The first connection portion 121C is sleeved with the resilient connection member 123 and in a sealed connection with the resilient connection member 123.

The support portion 121D is formed at a circumferential interior of the first principal portion 121A and protrudes from the first principal portion 121A. The ejector pin 1212 is disposed in the support portion 121D and faces the explosion-proof film 124.

Figure 5:
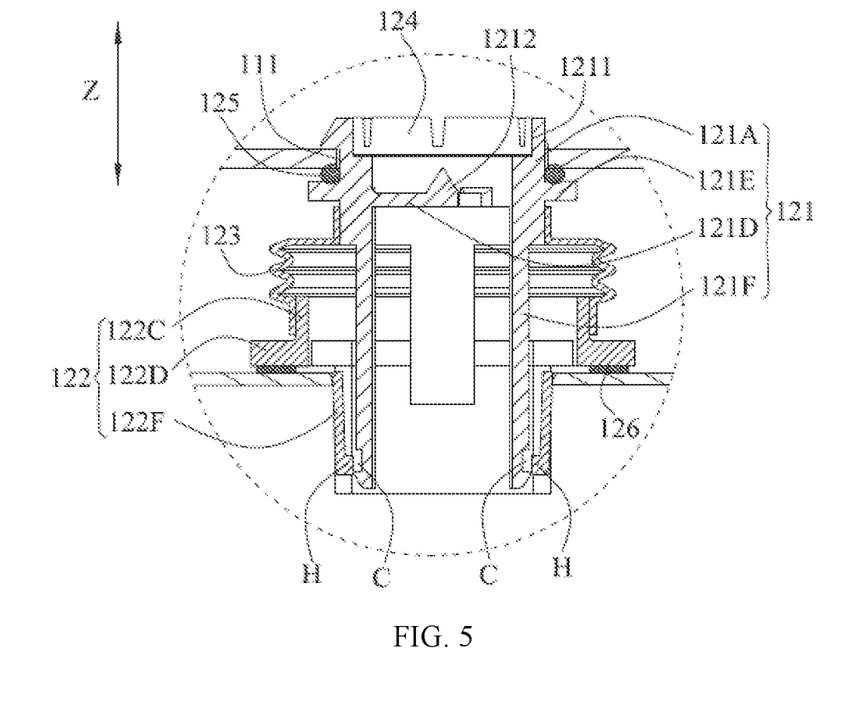
FIG. 5 is an enlarged view of a circled part in FIG. 4.
Figure 6:
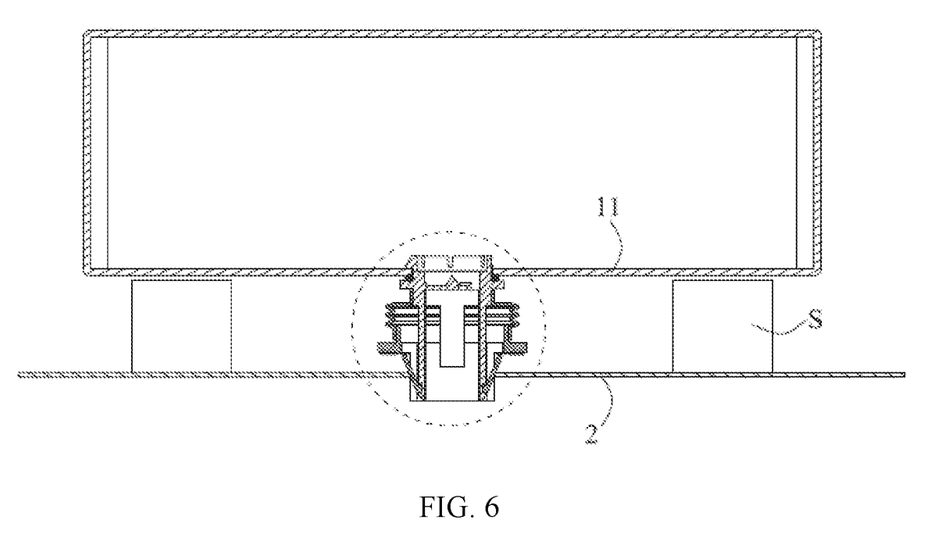
FIG. 6 is a schematic view of mounting of an explosion-proof valve of a battery pack and a vehicle body, where the explosion-proof valve and the vehicle body are in an incompletely assembled state.
Figure 7:
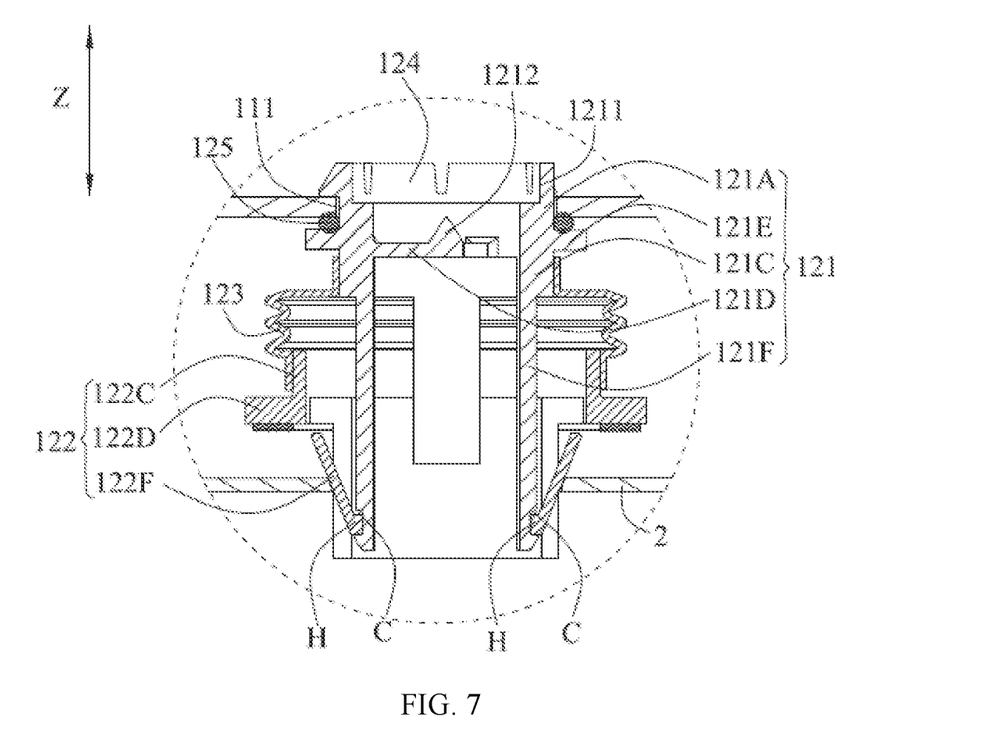
FIG. 7 is an enlarged view of a circled part in FIG. 6.

The first extension portion 121E is formed at a circumferential exterior of the first principal portion 121A and protrudes from the first principal portion 121A, and the first extension portion 121E is disposed at an interval from the first stop portion 121B in the up-down direction Z. A part of the first principal portion 121A between the first extension portion 121E and the first stop portion 121B is sleeved with the first sealing member 125. After the first connection member 121 of the explosion-proof valve 12 is mounted on the base plate 11 by using the first mounting hole 111 (as shown in FIG. 3, FIG. 5, and FIG. 7), the first extension portion 121E is located below the base plate 11. In this case, the first extension portion 121E and the base plate 11 jointly extrude the first sealing member 125 located between the first extension portion 121E and the base plate 11, so that the explosion-proof valve 12 is in a sealed connection with the base plate 11. The first sealing member 125 may be a structure such as an O-shaped sealing ring or washer.

Referring to FIG. 3, FIG. 5, FIG. 7, FIG. 12, and FIG. 13, the second connection member 122 of the explosion-proof valve 12 may include a second principal portion 122A, a second stop portion 122B, a second connection portion 122C, and a second extension portion 122D.

The second principal portion 122A extends along the up-down direction Z. In addition, a part of the second principal portion 122A is accommodated in the second mounting hole 21 of the vehicle body 2, and a part of the second principal portion 122A protrudes out of the second mounting hole 21 (that is, this part is out of the vehicle body 2).

The second stop portion 122B is disposed in the part of the second principal portion 122A that protrudes out of the vehicle body 2, and the second stop portion 122B may be formed at a circumferential exterior of the second principal portion 122A and protrudes from the second principal portion 122A. After the second connection member 122 of the explosion-proof valve 12 is mounted in the vehicle body 2 by using the second mounting hole 21 (as shown in FIG. 3 and FIG. 5), the second stop portion 122B of the second connection member 122 stops below the vehicle body 2, so that the explosion-proof valve 12 is fixed on the vehicle body 2.

At least an exterior surface part of the second stop portion 122B that is located below in the up-down direction Z forms a slope, so that the second stop portion 122B can protrude out of the vehicle body 2 with the second principal portion 122A. Further, the second stop portion 122B has certain resilience. To improve resilience of the second stop portion 122B when the second stop portion 122B inserts into the vehicle body 2, there may be a plurality of second stop portions 122B, and the plurality of second stop portions 122B are disposed at intervals along a circumferential direction of the second principal portion 122A.

The second connection portion 122C extends along the up-down direction Z and is located above the second principal portion 122A. The second connection portion 122C is sleeved with the resilient connection member 123 and in a sealed connection with the resilient connection member 123.

The second extension portion 122D is formed at a circumferential exterior of the second principal portion 122A and protrudes from the second principal portion 122A, and the second extension portion 122D is disposed at an interval from the second stop portion 122B in the up-down direction Z. A part of the second principal portion 122A between the second extension portion 122D and the second stop portion 122B is sleeved with the second sealing member 126. After the second connection member 122 of the explosion-proof valve 12 is mounted in the vehicle body 2 by using the second mounting hole 21 (as shown in FIG. 3 and FIG. 5), the second extension portion 122D is located above the vehicle body 2. In this case, the second extension portion 122D and the vehicle body 2 jointly extrude the second sealing member 126 located between the second extension portion 122D and the vehicle body 2, so that the explosion-proof valve 12 is in a sealed connection with the vehicle body 2. The second sealing member 126 may be a structure such as an O-shaped sealing ring or washer.

Figure 12:
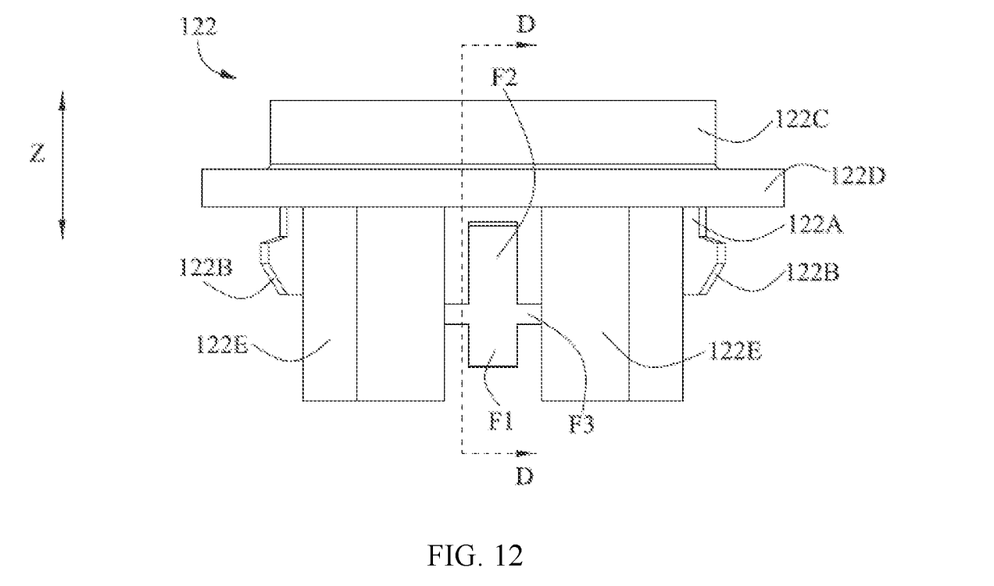
FIG. 12 is a main view of a second connection member of an explosion-proof valve in FIG. 8.
Figure 13:
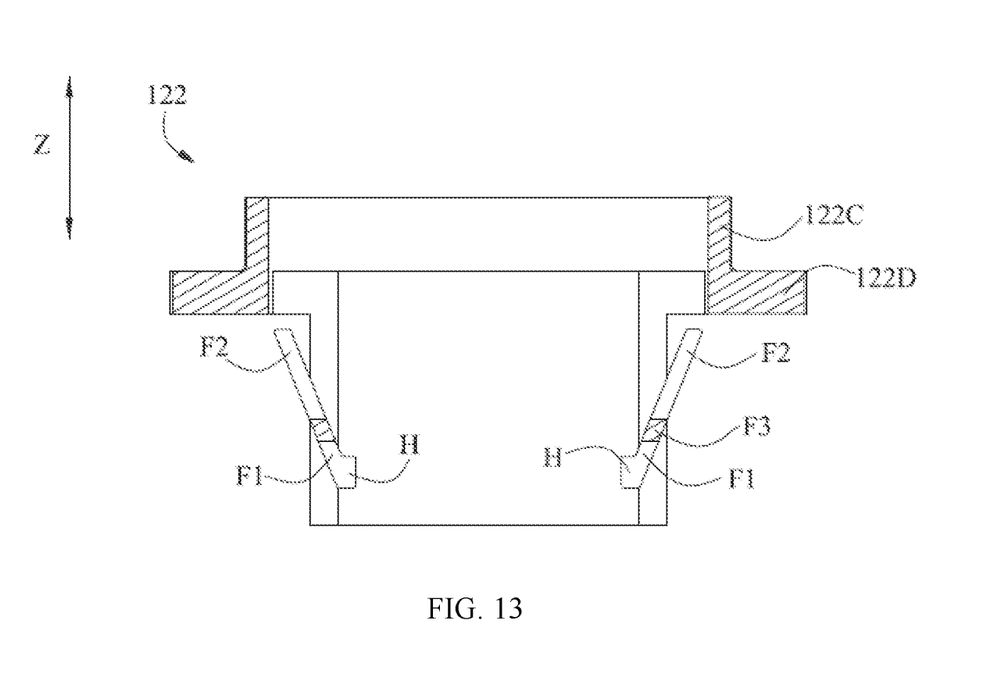
FIG. 13 is a sectional view taken along a D-D line in FIG. 12.

Referring to FIG. 5, FIG. 7, and FIG. 9 to FIG. 13, the first connection member 121 may further include a first pole portion 121F. The first pole portion 121F extends along the up-down direction Z and is located below the first connection portion 121C. The second connection member 122 may further include a plurality of second pole portions 122E (as shown in FIG. 3 and FIG. 12) and resilient cantilevers 122F, the plurality of second pole portions 122E are disposed at intervals along a circumferential direction and jointly enclose a hollow cavity, each second pole portion 122E extends along the up-down direction Z and is connected to the second principal portion 122A, and a resilient cantilever 122F is connected to two adjacent second pole portions 122E in a cantilever mode.

Specifically, the resilient cantilevers 122F are disposed in pairs opposite to each other. In addition, one or more pairs of resilient cantilevers 122F may be disposed based on an actual situation.

It should be noted that because the explosion-proof valve 12 is mounted on the base plate 11 of the case and may be subject to an impact and damage during transport of the battery pack, the second connection member 122 of the explosion-proof valve 12 may be first assembled with the first connection member 121 before the explosion-proof valve 12 is mounted in the vehicle body 2. This facilitates independent transport of the battery pack 1 and the explosion-proof valve 12 and facilitates mounting of the explosion-proof valve 12 in the vehicle body 2.

A specific assembly process of the explosion-proof valve 12 is as follows: First, the first connection member 121 is flexibly connected to the second connection member 122 by using the resilient connection member 123; and then the first connection member 121 is rigidly connected to the second connection member 122 based on cooperation between the first pole portion 121F of the first connection member 121 and the resilient cantilever 122F of the second connection member 122 (as shown in FIG. 7 and FIG. 10). In this way, the explosion-proof valve 12 is assembled (in this case, the explosion-proof valve 12 is a rigid structure, as shown in the figures). After the explosion-proof valve 12 is assembled, the explosion-proof valve 12 can be conveniently transported independently, and the explosion-proof valve 12 in an assembled state is in a rigid state. When the explosion-proof valve 12 is mounted in the vehicle body 2, because the explosion-proof valve 12 is a rigid structure on the whole, problems such as difficulty in mounting and positioning and impossibility of assembling by force due to flexibility of the resilient connection member 123 are avoided. Therefore, efficiency of mounting the battery pack 1 in the vehicle body 2 is improved.

Specifically, referring to FIG. 8, FIG. 10, FIG. 12, and FIG. 13, the resilient cantilever 122F may have a first end portion F1, a second end portion F2, and a coupling shaft portion F3. The first end portion F1 and the second end portion F2 are located on two sides of the coupling shaft portion F3 in the up-down direction Z, and the coupling shaft portion F3 protrudes from the first end portion F1 and the second end portion F2 and is connected to two adjacent second pole portions 122E. The coupling shaft portion F3 of the resilient cantilever 122F is integrated with the first end portion F1 and the second end portion F2 to form a cross-shaped structure (as shown in FIG. 12).

Before the first connection member 121 and the second connection member 122 are assembled, the resilient cantilever 122F of the second connection member 122 is in a free loose state. In this case, the second end portion F2 of the resilient cantilever 122F is located outside the plurality of second pole portions 122E (that is, the second end portion F2 is located outside the hollow cavity enclosed by the plurality of second pole portions 122E), but the first end portion F1 is located inside the plurality of second pole portions 122E (that is, the first end portion F1 is located inside the hollow cavity enclosed by the plurality of second pole portions 122E). In other words, the resilient cantilever 122F is inclined relative to a central axis of the hollow cavity by a certain angle on the whole.

A cooperation mode between the resilient cantilever 122F of the second connection member 122 and the first pole portion 121F of the first connection member 121 may be tongue-groove cooperation. In this way, the first connection member 121 is rigidly connected to the second connection member 122. Specifically, a tongue H or a groove C may be disposed in the first end portion F1 of the resilient cantilever 122F; and correspondingly, a groove C or a tongue H may be disposed at an end of the first pole portion 121F.

After the first connection member 121 and the second connection member 122 of the explosion-proof valve 12 are assembled, the first end portion F1 of the resilient cantilever 122F is in tongue-groove cooperation with the end of the first pole portion 121F. In this case, the tongue H is accommodated in the groove C and stops in the groove C (as shown in FIG. 7 and FIG. 10). During assembly of the first connection member 121 and the second connection member 122, because an interior wall of the groove C extrudes the tongue H, and with the extrusion, the first end portion F1 of the resilient cantilever 122F moves outward relative to an end of the second pole portion 122E, so that the tongue H and the groove C abut each other. In this way, the first connection member 121 is rigidly connected to the second connection member 122 (in this case, the explosion-proof valve 12 is a rigid structure). When the explosion-proof valve 12 is in the rigid state, based on the rigid structure of the explosion-proof valve 12, the second connection member 122 of the explosion-proof valve 12 can be quickly and accurately inserted in the second mounting hole 21 of the vehicle body 2 (in this case, the end of the first pole portion 121F of the first connection member 121 and a part of the second pole portion 122E of the second connection member 122 both extend below the second mounting hole 21, as shown in FIG. 7). Therefore, efficiency of mounting the battery pack 1 in the vehicle body 2 is improved.

Further, after the second connection member 122 is inserted in the second mounting hole 21 of the vehicle body 2, the second connection member 122 continues to be pressed down. When the second end portion F2 of the resilient cantilever 122F enters the second mounting hole 21, a surrounding wall of the second mounting hole 21 extrudes the second end portion F2 of the resilient cantilever 122F, so that the first end portion F1 of the resilient cantilever 122F gradually moves away from the end of the first pole portion 121F, until a cooperation relationship between the first pole portion 121F and the resilient cantilever 122F is completely canceled (that is, a tongue-groove cooperation relationship between the tongue H and the groove C is canceled; in this case, the first end portion F1 of the resilient cantilever 122F is opposite to the end of the first pole portion 121F and is disposed at an interval from the end of the first pole portion 121F, as shown in FIG. 5). In this way, the explosion-proof valve 12 is mounted in the vehicle body 2. In other words, after the explosion-proof valve 12 and the vehicle body 2 are assembled, the rigid connection between the first connection member 121 and the second connection member 122 is released. In this case, the first connection member 121 can only be flexibly connected to the second connection member 122 by using the resilient connection member 123. Based on resilience of the resilient connection member 123, the explosion-proof valve 12 not only can absorb the assembly tolerance between the battery pack 1 and the vehicle body 2, but also can absorb an external vibration and impact in time, thereby improving reliability of the connection between the battery pack 1 and the vehicle body 2 and reliability of sealing.

What is claimed is:

1. An explosion-proof valve, comprising a first connection member, a second connection member, a resilient connection member, and an explosion-proof film; wherein:
   an upper port is formed on the first connection member, and the first connection member comprises an ejector pin;
   the second connection member is located below the first connection member in an up-down direction, and is disposed at an interval from the first connection member;
   the resilient connection member sleeves the first connection member and the second connection member, and is in a sealed connection with the first connection member and the second connection member; and
   the explosion-proof film is disposed at the upper port of the first connection member and seals the upper port, and the explosion-proof film is located above the ejector pin in the up-down direction.

2. The explosion-proof valve according to claim 1, wherein:
   the first connection member comprises a first principal portion and a first connection portion; and
   the first principal portion extends along the up-down direction and the upper port is formed therein, the first connection portion extends along the up-down direction and is located below the first principal portion, and the first connection portion is tightly in a sealed connection with the resilient connection member.

3. The explosion-proof valve according to claim 2, wherein:
   the first connection member further comprises a first stop portion and a first extension portion;
   the first stop portion is formed at a circumferential exterior of the first principal portion and protrudes from the first principal portion, the first extension portion is formed at a circumferential exterior of the first principal portion and protrudes from the first principal portion, and the first extension portion is disposed at an interval from the first stop portion in the up-down direction; and
   the explosion-proof valve further comprises a first sealing member, and the first principal portion is sleeved with the first sealing member between the first stop portion and the first extension portion.

4. The explosion-proof valve according to claim 2, wherein:
   the first connection member further comprises a support portion, the support portion is formed at a circumferential interior of the first principal portion and protrudes from the first principal portion, and the ejector pin is disposed in the support portion and faces the explosion-proof film.

5. The explosion-proof valve according to claim 2, wherein:
   the second connection member comprises a second principal portion and a second connection portion; and
   the second principal portion extends along the up-down direction, the second connection portion extends along the up-down direction and is located above the second principal portion, and the second connection portion is tightly in a sealed connection with the resilient connection member.

6. The explosion-proof valve according to claim 5, wherein:
   the second connection member further comprises a second stop portion and a second extension portion;
   the second stop portion is formed at a circumferential exterior of the second principal portion and protrudes from the second principal portion, the second extension portion is formed at a circumferential exterior of the second principal portion and protrudes from the second principal portion, and the second extension portion is disposed at an interval from the second stop portion in the up-down direction; and
   the explosion-proof valve further comprises a second sealing member, and the second principal portion is sleeved with the second sealing member between the second stop portion and the second extension portion.

7. The explosion-proof valve according to claim 5, wherein:
   the first connection member further comprises a first pole portion, and the first pole portion extends along the up-down direction and is located below the first connection portion;
   the second connection member further comprises a plurality of second pole portions and resilient cantilevers, the plurality of second pole portions are disposed at intervals along a circumferential direction, each second pole portion extends along the up-down direction and is connected to the second principal portion, and a resilient cantilever is connected to two adjacent second pole portions in a cantilever mode; and
   the resilient cantilever of the second connection member cooperates with the first pole portion of the first connection member, so that the first connection member is connected to the second connection member.

8. The explosion-proof valve according to claim 7, wherein:
   a cooperation mode between the resilient cantilever of the second connection member and the first pole portion of the first connection member is tongue-groove cooperation.

9. The explosion-proof valve according to claim 7, wherein:
   the resilient cantilever has a first end portion, a second end portion, and a coupling shaft portion;
   the first end portion and the second end portion are located on two sides of the coupling shaft portion in the up-down direction, and the coupling shaft portion protrudes from the first end portion and the second end portion and is connected to two adjacent second pole portions; and
   the first end portion of the resilient cantilever cooperates with an end of the first pole portion, so that the first connection member is connected to the second connection member.

10. The explosion-proof valve according to claim 7, wherein the resilient cantilever is inclined relative to a central axis of a hollow cavity enclosed by the plurality of second pole portions.

11. A battery pack, comprising:
    a case, wherein the case comprises a base plate provided with a first mounting hole; and
    an explosion-proof valve, wherein the explosion-proof valve comprises a first connection member, a second connection member, a resilient connection member, and an explosion-proof film, the first connection member is disposed in the first mounting hole and tightly in a sealed connection with the base plate, and the second connection member and the resilient connection member are located below the base plate in the up-down direction;

an upper port is formed on the first connection member, and the first connection member comprises an ejector pin;

the second connection member is located below the first connection member in an up-down direction, and is disposed at an interval from the first connection member;

the resilient connection member sleeves the first connection member and the second connection member, and is in a sealed connection with the first connection member and the second connection member; and the explosion-proof film is disposed at the upper port of the first connection member and seals the upper port, and the explosion-proof film is located above the ejector pin in the up-down direction.

12. The battery pack according to claim 11, wherein:
the first connection member comprises a first principal portion and a first connection portion; and
the first principal portion extends along the up-down direction and the upper port is formed therein, the first connection portion extends along the up-down direction and is located below the first principal portion, and the first connection portion is tightly in a sealed connection with the resilient connection member.

13. The battery pack according to claim 12, wherein:
the first connection member further comprises a first stop portion and a first extension portion;
the first stop portion is formed at a circumferential exterior of the first principal portion and protrudes from the first principal portion, the first extension portion is formed at a circumferential exterior of the first principal portion and protrudes from the first principal portion, and the first extension portion is disposed at an interval from the first stop portion in the up-down direction; and
the explosion-proof valve further comprises a first sealing member, and the first principal portion is sleeved with the first sealing member between the first stop portion and the first extension portion.

14. The battery pack according to claim 12, wherein:
the first connection member further comprises a support portion, the support portion is formed at a circumferential interior of the first principal portion and protrudes from the first principal portion, and the ejector pin is disposed in the support portion and faces the explosion-proof film.

15. The battery pack according to claim 12, wherein:
the second connection member comprises a second principal portion and a second connection portion; and
the second principal portion extends along the up-down direction, the second connection portion extends along the up-down direction and is located above the second principal portion, and the second connection portion is tightly in a sealed connection with the resilient connection member.

16. An electric vehicle, comprising:
a vehicle body, wherein the vehicle body is provided with a second mounting hole; and
a battery pack, wherein the battery pack comprises:
a case, wherein the case comprises a base plate provided with a first mounting hole; and
an explosion-proof valve, wherein the explosion-proof valve comprises a first connection member, a second connection member, a resilient connection member, and an explosion-proof film, the first connection member is disposed in the first mounting hole and tightly in a sealed connection with the base plate, and the second connection member and the resilient connection member are located below the base plate in the up-down direction;

an upper port is formed on the first connection member, and the first connection member comprises an ejector pin;

the second connection member is located below the first connection member in an up-down direction, and is disposed at an interval from the first connection member;

the resilient connection member sleeves the first connection member and the second connection member, and is in a sealed connection with the first connection member and the second connection member; and the explosion-proof film is disposed at the upper port of the first connection member and seals the upper port, and the explosion-proof film is located above the ejector pin in the up-down direction.

17. The electric vehicle according to claim 16, wherein:
the explosion-proof valve of the battery pack is directly disposed on the base plate of the case by using the first connection member and directly disposed in the vehicle body by using the second connection member, a part of the explosion-proof valve extends into the case, and a part of the explosion-proof valve protrudes out of the vehicle body.

18. The electric vehicle according to claim 16, wherein:
the first connection member comprises a first pole portion, and the first pole portion extends along the up-down direction;
the second connection member comprises a plurality of second pole portions and resilient cantilevers, the plurality of second pole portions are disposed at intervals along a circumferential direction, each second pole portion extends along the up-down direction, and a resilient cantilever is connected to second pole portions in a cantilever mode; and
an end of the first pole portion and a part of the second pole portion both extend below the second mounting hole.

19. The electric vehicle according to claim 18, wherein:
the resilient cantilever has a first end portion, a second end portion, and a coupling shaft portion;
the first end portion and the second end portion are located on two sides of the coupling shaft portion in the up-down direction, and the coupling shaft portion protrudes from the first end portion and the second end portion and is connected to two adjacent second pole portions; and
the second end portion is located in the second mounting hole, the first end portion extends below the second mounting hole, and an interior wall of the second mounting hole firmly presses the second end portion of the resilient cantilever, so that the first end portion of the resilient cantilever and the end of the first pole portion are opposite to each other and disposed at an interval.

20. The electric vehicle according to claim 16, wherein:
the first connection member further comprises a support portion, the support portion is formed at a circumferential interior of the first principal portion and protrudes from the first principal portion, and the ejector pin is disposed in the support portion and faces the explosion-proof film.

\* \* \* \* \*